(12) United States Patent
Dennison et al.

(10) Patent No.: US 9,664,544 B2
(45) Date of Patent: May 30, 2017

(54) THERMAL-TYPE FLOWMETER HAVING SEPARATE PROBE MOUNTING ARRANGEMENT, A MECHANICAL MOUNTING STRUCTURE, AND VALVES FOR EACH PROBE

(71) Applicant: CDI Meters, Inc., Woburn, MA (US)

(72) Inventors: Roger Dennison, Lexington, MA (US); Christopher Corsino, Lakeville, MA (US)

(73) Assignee: CDI Meters, Inc., Woburn, MA (US)

( * ) Notice: Subject to any disclaimer, the term of this patent is extended or adjusted under 35 U.S.C. 154(b) by 32 days.

(21) Appl. No.: 14/597,544

(22) Filed: Jan. 15, 2015

(65) Prior Publication Data

US 2015/0185059 A1    Jul. 2, 2015

Related U.S. Application Data

(63) Continuation-in-part of application No. 13/916,119, filed on Jun. 12, 2013, now abandoned.

(60) Provisional application No. 61/715,904, filed on Oct. 19, 2012, provisional application No. 61/722,833, filed on Nov. 6, 2012.

(51) Int. Cl.
*G01F 1/68* (2006.01)
*G01F 1/684* (2006.01)

(52) U.S. Cl.
CPC ............ *G01F 1/684* (2013.01); *G01F 1/6842* (2013.01); *Y10T 29/49826* (2015.01)

(58) Field of Classification Search
None
See application file for complete search history.

(56) References Cited

U.S. PATENT DOCUMENTS

| | | | | | |
|---|---|---|---|---|---|
| 3,619,840 | A | * | 11/1971 | Spellman et al. | H01J 37/3053 373/13 |
| 3,869,184 | A | * | 3/1975 | Lambert | A47B 88/0044 160/216 |
| 4,529,867 | A | * | 7/1985 | Velnosky | A61M 16/162 137/391 |
| 4,959,990 | A | * | 10/1990 | Morris | G01F 1/46 73/1.29 |
| 5,396,814 | A | * | 3/1995 | Tuttle | F16L 41/04 137/15.01 |
| 6,487,904 | B1 | * | 12/2002 | Myhre | G01F 1/684 73/204.12 |
| 6,802,217 | B2 | * | 10/2004 | Dennison | G01F 1/69 73/204.11 |
| 9,182,261 | B1 | * | 11/2015 | Chen | G01F 1/684 |

(Continued)

*Primary Examiner* — Harshad R Patel
(74) *Attorney, Agent, or Firm* — Brian M. Dingman; Dingman IP Law, PC

(57) ABSTRACT

A flowmeter of the thermal type, having a heated flow-sensing element and a temperature-sensing reference element, the elements constructed and arranged to be installed in a pressurized pipe. The flowmeter has one probe with the heated element and a separate second probe with the reference element. The probes are constructed and arranged to pass through the pipe wall in separate through-holes. There is a mounting structure such as a split ring that is adapted to be mounted to the pipe. Two valves operatively coupled to separate locations of the mounting structure, where one probe passes through each valve and into the pipe.

15 Claims, 18 Drawing Sheets

(56) References Cited

U.S. PATENT DOCUMENTS

| | | | |
|---|---|---|---|
| 2003/0101808 A1* | 6/2003 | Dennison | G01F 1/684 73/204.11 |
| 2009/0272187 A1* | 11/2009 | Sukegawa | G01F 1/684 73/204.27 |
| 2015/0192442 A1* | 7/2015 | Olin | G01F 1/692 73/204.26 |

* cited by examiner

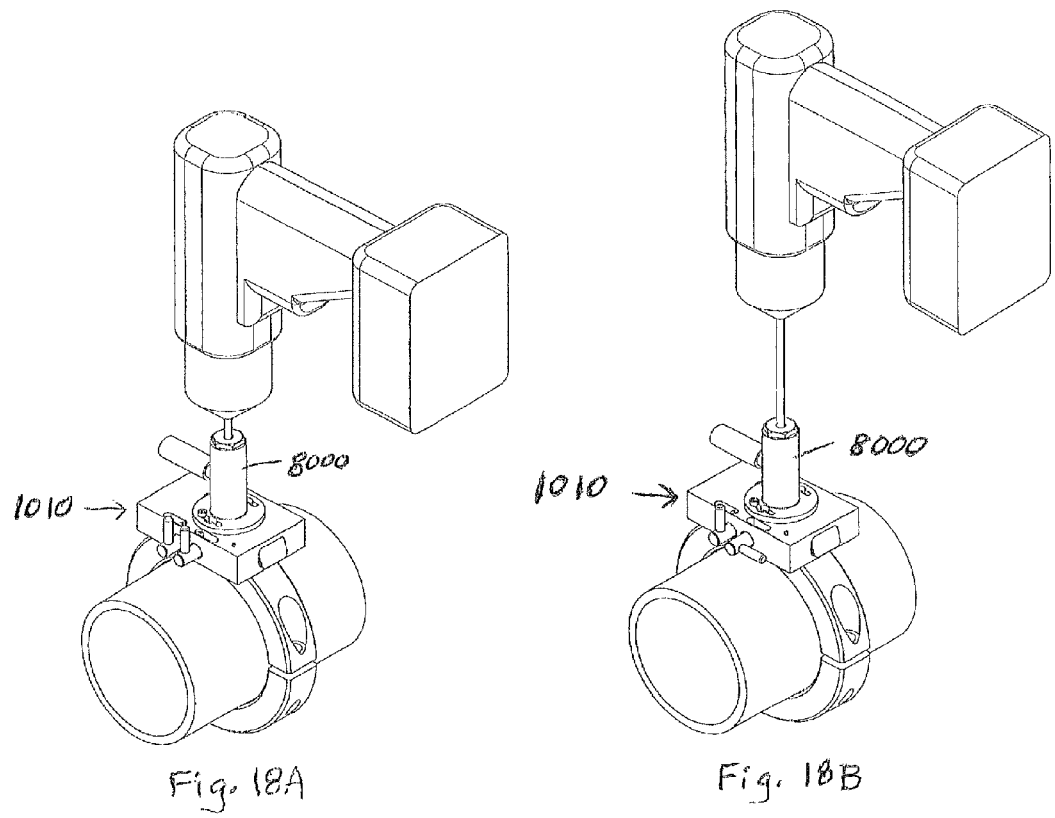
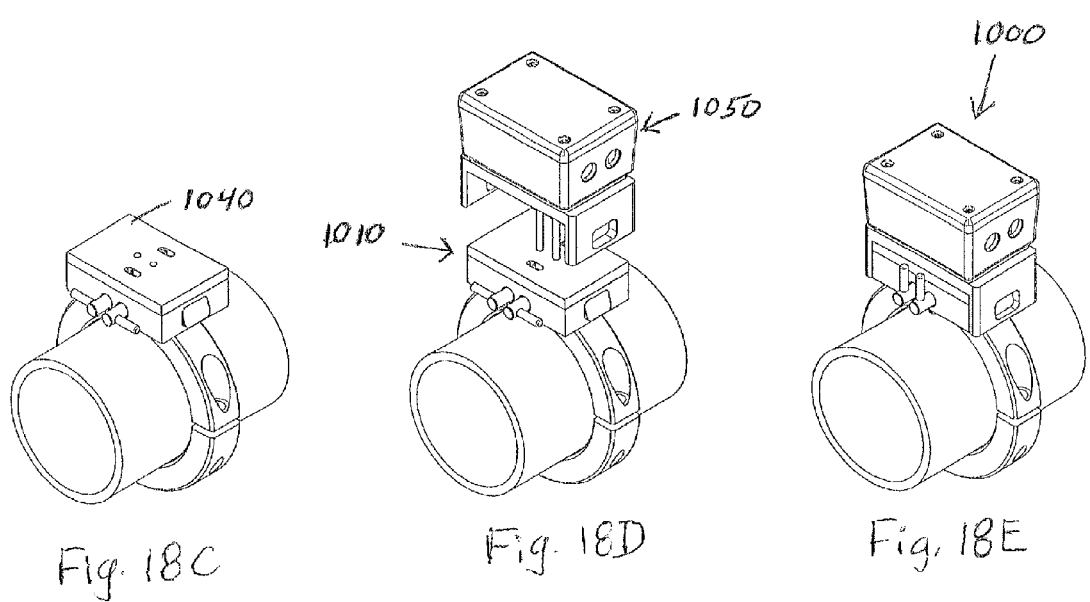

THERMAL-TYPE FLOWMETER HAVING SEPARATE PROBE MOUNTING ARRANGEMENT, A MECHANICAL MOUNTING STRUCTURE, AND VALVES FOR EACH PROBE

CROSS-REFERENCE TO RELATED APPLICATIONS

This application is a continuation in part of and claims priority of application Ser. No. 13/916,119, filed on Jun. 12, 2013, which itself claims priority of two Provisional patent applications: application Ser. No. 61/715,904, filed on Oct. 19, 2012, and application Ser. No. 61/722,833 filed on Nov. 6, 2012. The disclosures of these three applications are incorporated herein by reference.

FIELD

A thermal flowmeter designed for easy installation in a pressurized compressed-air pipe.

BACKGROUND

Thermal flowmeters operate on the well-known thermal principal by which one element is heated and maintained warmer than a second element; the amount of heat required to maintain the temperature difference is a measure of the fluid mass velocity. The two elements are normally built into a single probe. When the flowmeter is to be installed into a pressurized pipe, the probe is inserted through a valve into the pipe. The probe has a relatively large diameter and so a large hole, typically ⅝ inch in diameter or larger, must be drilled in the pipe. The force exerted by the compressed air on a drill entering the pipe is sufficient to require specialized equipment to restrain the drill.

SUMMARY

The subject flowmeter operates on the thermal principal by which one element is heated and maintained warmer than a second element, the amount of heat required to maintain the temperature difference being a measure of the fluid mass velocity. The two elements can be separated and placed in small probes that can be inserted into the pipe through small holes that are easily drilled in the pipe. The flowmeter thus can be installed in a pipe that is in service.

The currently preferred embodiment of the flowmeter includes a split ring suitable for clamping around a pipe affixed to a mounting plate, two valves contained within the mounting plate, a removable seal plate configured to affix to the mounting plate and seal around the probes, and an assembly including the probes and electronics to measure, report and display flow, that assembly configured to latch to the mounting plate. It may also include a removable drill guide and filter assembly for use during installation. There may be a drill bit having a long shank and a short flute that is used during installation.

To install this example of the flowmeter on a pipe containing compressed air, the user first clamps the split ring to the pipe, next drills two holes into the pipe through the valves, closing the valves as the user retracts the drill bit, then installs the seal plate to provide seals around the probes when they are installed, and then installs the probe and electronics assembly by inserting the probes through the valves into the pipe and latching the assembly into place. The user then connects power to the meter and it will display flow.

In another example of the invention, the flowmeter may include a split ring suitable for clamping around a pipe, two valves mounted on the ring, mounting fittings, two probe assemblies, an electronic enclosure that is electrically connected to the probe assemblies and containing electronics to measure, report and display flow, and a removable drill guide and filter assembly for use during installation. There may be a drill bit having a long shank and a short flute that is used during installation.

To install this example of the flowmeter on a pipe containing compressed air, the user clamps the split ring to the pipe, and then installs each probe by drilling a hole in the pipe through the corresponding valve, partially withdrawing the drill so that chips vent into the filter, closing the valve, and then inserting the probe through the valve and securing it in place. The user then connects power to the meter and it will display flow.

All examples of the flowmeter may further include a drill guide and filter assembly adapted to be releasably coupled to the mounting fitting. The drill guide and filter assembly may include a drill guide assembly with a longitudinal opening that is adapted to receive a drill bit. The drill guide and filter assembly may further include a filter that is fluidly coupled to the opening at a coupling location. The longitudinal opening may be larger below the coupling location than it is above the coupling location. The flowmeter may further include an O-ring that forms a seal between the mechanical structure and the pipe, where the O-ring is separated from the path of the drill by a solid barrier.

BRIEF DESCRIPTION OF THE DRAWINGS

Other objects, features and examples will occur to those skilled in the art from the following description and the accompanying drawings, in which:

FIGS. 18A-18E show the sequence of steps in installing the second example of the flowmeter.

DETAILED DESCRIPTION

The disclosure includes a flowmeter of the thermal type designed for installation in a compressed-air line under pressure. The flowmeter can be used to sense the flow of compressed air. The flowmeter has a heated element and an unheated element. The heated and unheated elements can be in separate probes, and the probes are adapted for insertion through valves into a pipe. Accordingly, the required holes in the pipe are small and the attendant apparatus is compact, facilitating installation and allowing installation in a pipe that is in use carrying compressed air.

Figure 1:
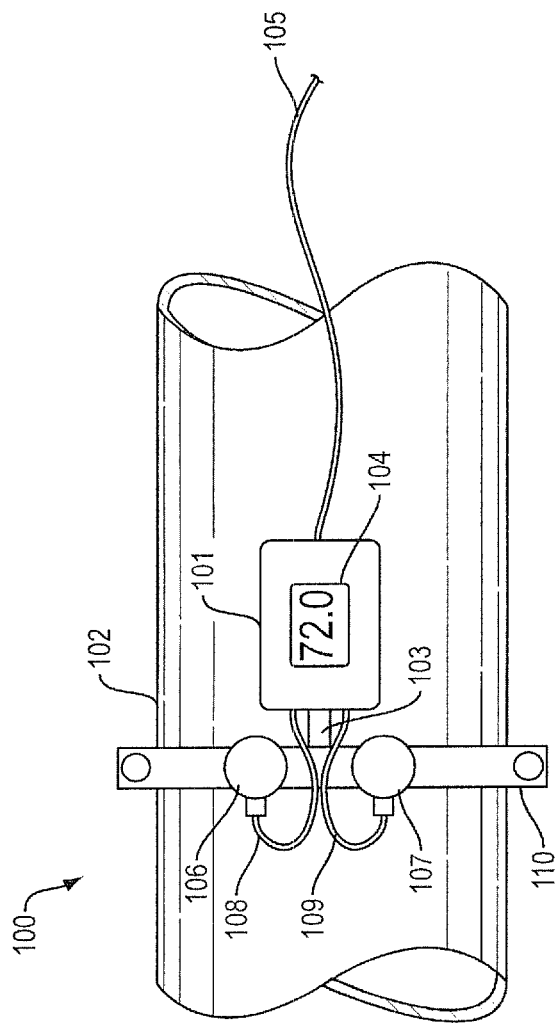
FIG. 1 is an overall view of one example of a flowmeter mounted on a section of pipe.

FIG. 1 is an overall view of one example of the disclosed flowmeter 100. A control enclosure 101 is mounted on a split ring 110 by bracket 103 which can include provisions (not shown) for the enclosure to be rotated to accommodate horizontal or vertical pipes. The control enclosure includes a display 104 and a cable 105 receiving power from an outside source. The control enclosure is connected to probe assemblies 106, 107 by cables 108, 109. Split ring 110 clamps to the pipe 102.

Figure 2:
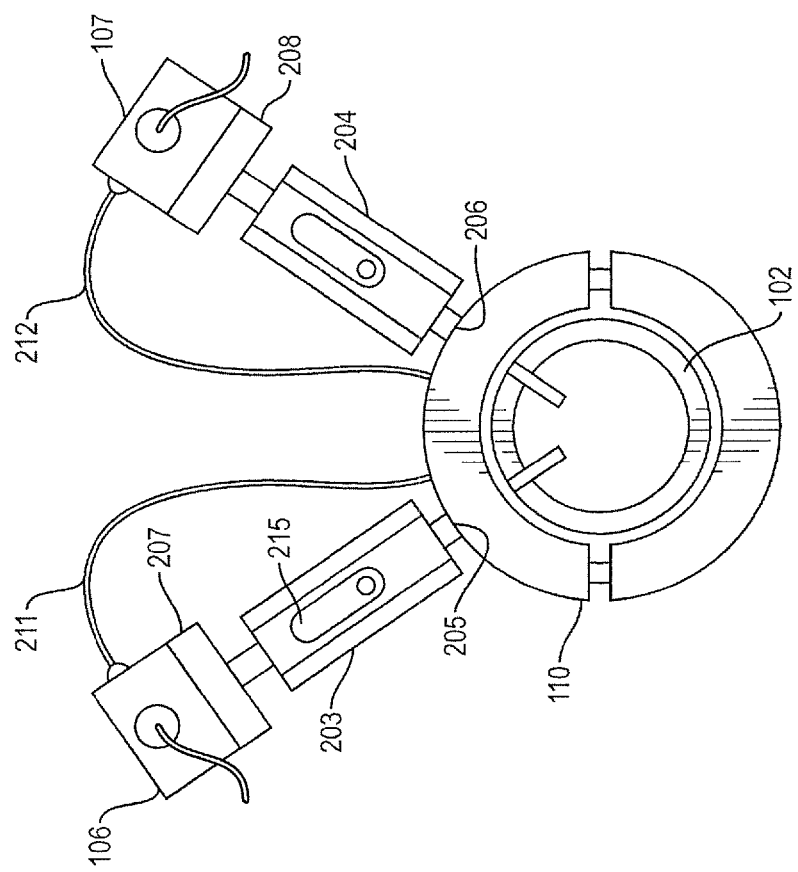
FIG. 2 is an end view, partially in section, showing the probe assemblies inserted through the mounting fittings, the valves and the ring into the pipe.

FIG. 2 is an end view showing the mounting of the probes. An appropriate mechanical mounting structure such as a split ring 110, typically made of aluminum, is clamped to pipe 102 by cap screws (not shown). The mounting structure could be something other than a split ring, e.g., a metal part affixed to the pipe by a band clamp or another type of clamp. Ball valves 203, 204 are threaded into the mounting structure in tapped holes 205, 206. These valves are preferably ⅛-inch pipe size, brass with stainless-steel balls, and with a male thread on one end and a female thread on the other. Other types of valves could be used, e.g., slide valves, plug valves or gate valves. Threaded into the valves are mounting fittings 207, 208, and affixed to these are probe assemblies 106, 107. Optional safety cables 211, 212 prevent ejection of the probe assemblies from the meter.

Figure 3:
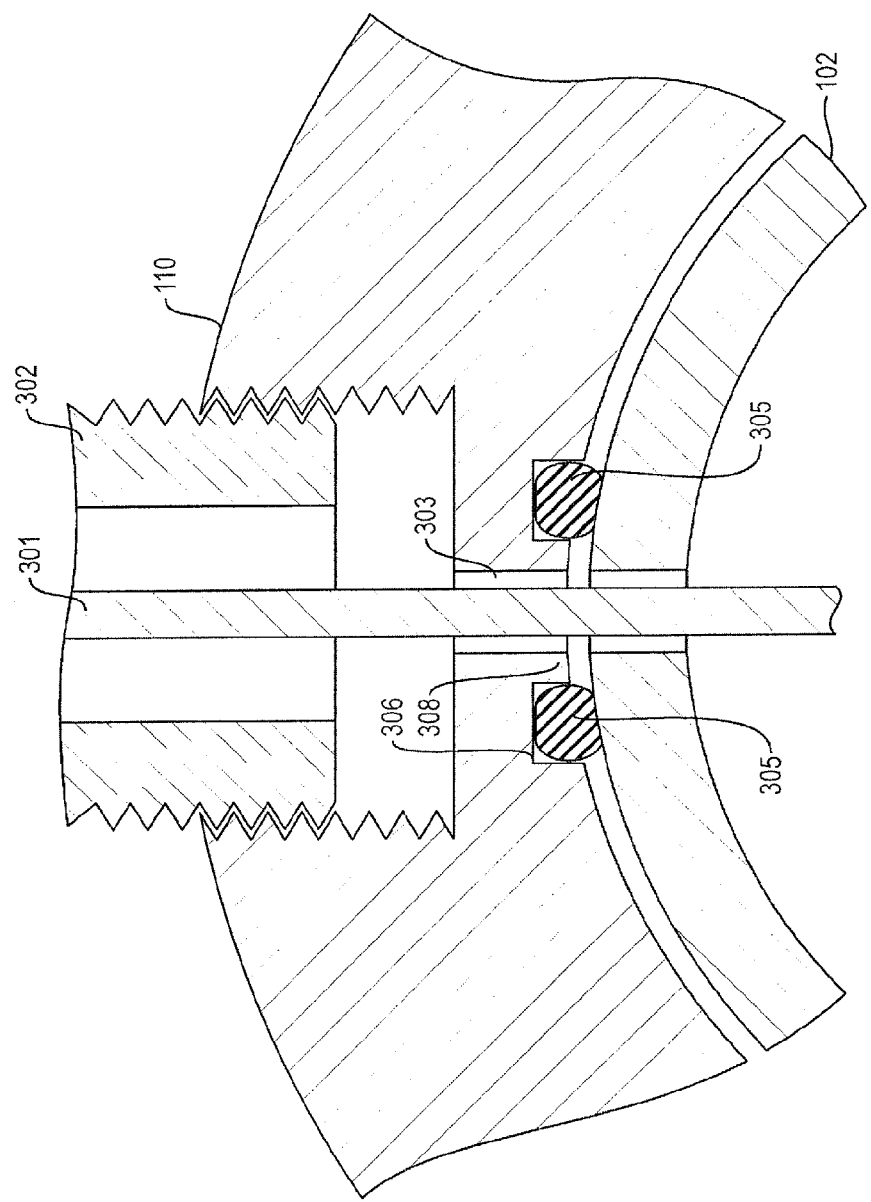
FIG. 3 is an enlarged sectional view showing the O-ring gasket surrounding one of the probes and compressed between the ring and the pipe.

FIG. 3 is an enlarged sectional detail of the area where one of the probes enters the pipe. The probe 301 exits the male thread 302 at the base of the valve and passes through a close-fitting hole 303 in the ring 110. This hole constrains the motion of the probe. O-ring 305 in groove 306 forms a seal between the ring and the pipe 102. A wall of metal 308 separates the O-ring from the hole through which the drill passes to protect the O-ring when the hole in the pipe is being drilled.

Figure 4:
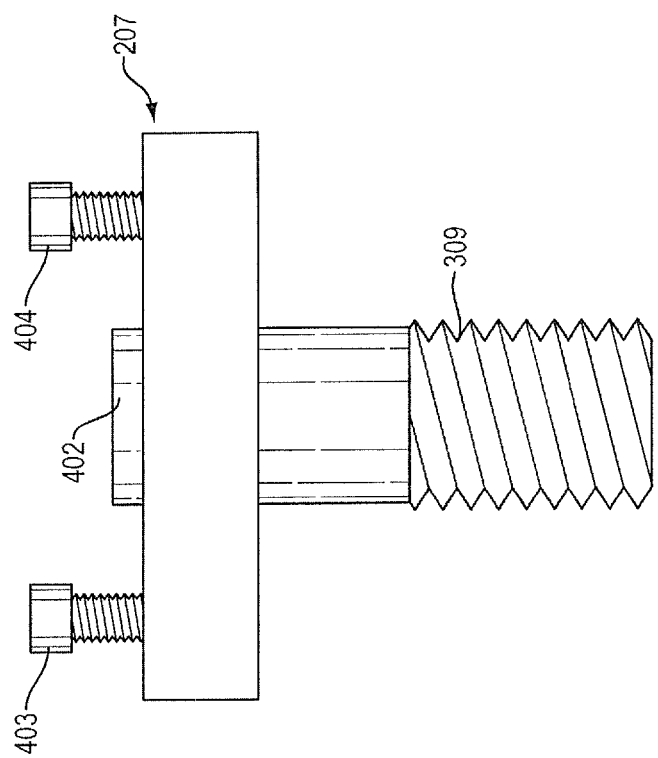
FIG. 4 is a side view of the mounting fitting.

FIG. 4 shows one of the mounting fittings 207 which screw into the tops of the valves. It is typically made of aluminum or brass. It has a pipe thread 309 at its base to fit the thread in the valve, a raised circular portion 402 at the center of its top surface to center the drill guide, two socket head cap screws 403, 404 in threaded holes to engage the two parts that will, in succession, mount on it, and a drilled hole (not shown) in its center, slightly larger than the diameter of the drill that will pass through it.

Figure 5:
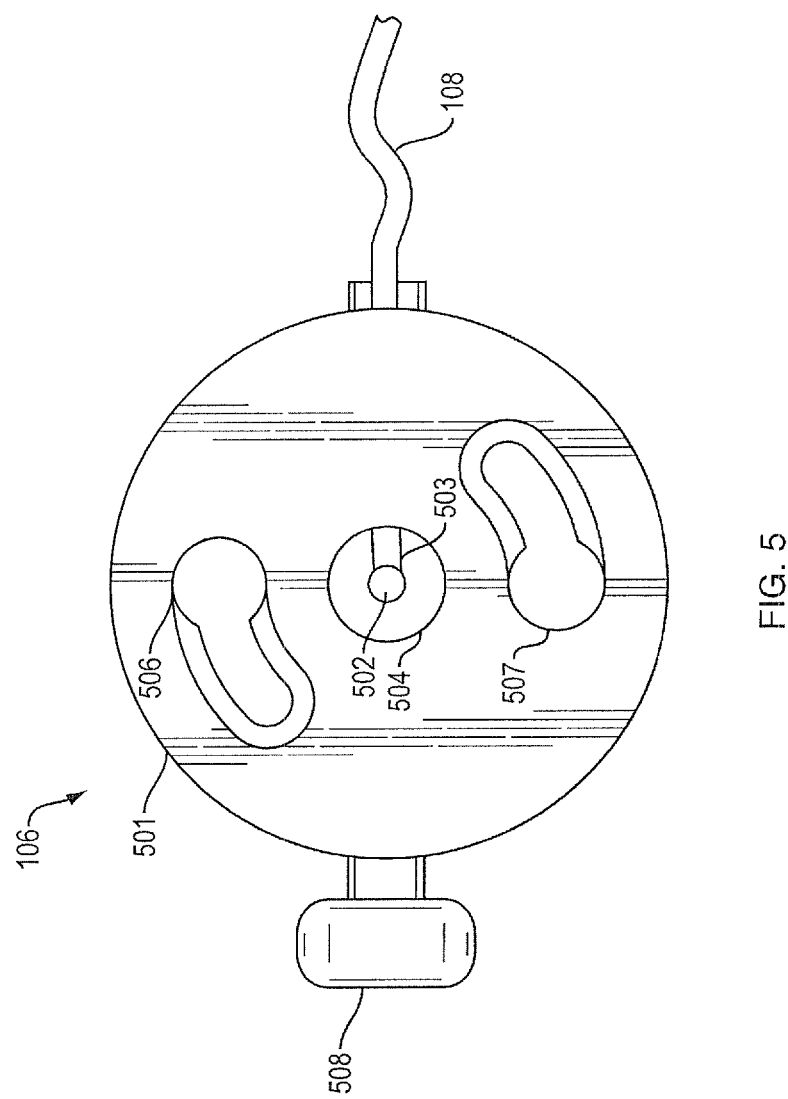
FIG. 5 is a top view of the probe assembly.

FIG. 5 is a top view of one of the probe assemblies 106. The base portion 501, typically made of aluminum, has a small hole in its center, 502 to receive the probe. Wires 503 from the probe pass through a space 504 at the center of the base portion and exit through one side as a cable 108. Two curved, slotted holes, 506, 507 are shaped to receive the cap screws 403 and 404 in FIG. 4 when the probe is inserted into the mounting fitting turned at an angle, and to engage them when it is rotated to its normal position. An enlarged-head projection (e.g., a knob) 508 provides for the attachment of a safety cable (not shown) to prevent the probe assembly from being ejected during or after assembly.

Figure 6:
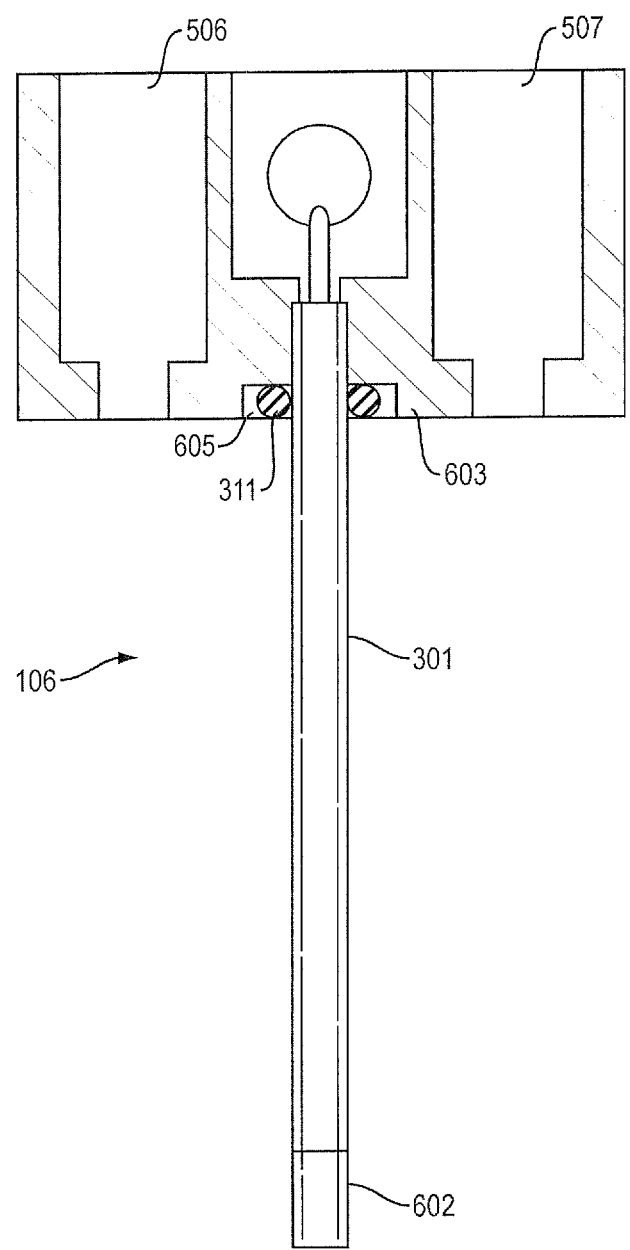
FIG. 6 is a sectional side view of the probe assembly.

FIG. 6 is a partial sectional view of one probe assembly 106. It includes the probe 301 whose body is typically a stainless-steel tube, with a thermally-conductive tip 602 containing an RTD (not shown) and surrounded by the tube but exposed at the end. Thermal contact between the tip and the tube is provided by thermally-conductive epoxy, thermally-conductive silicone, or a similar material. Where the probe enters the base piece 603, it is held in place by epoxy or a similar adhesive (not shown) and surrounded by an O-ring 311 set in a groove 605.

Figure 7:
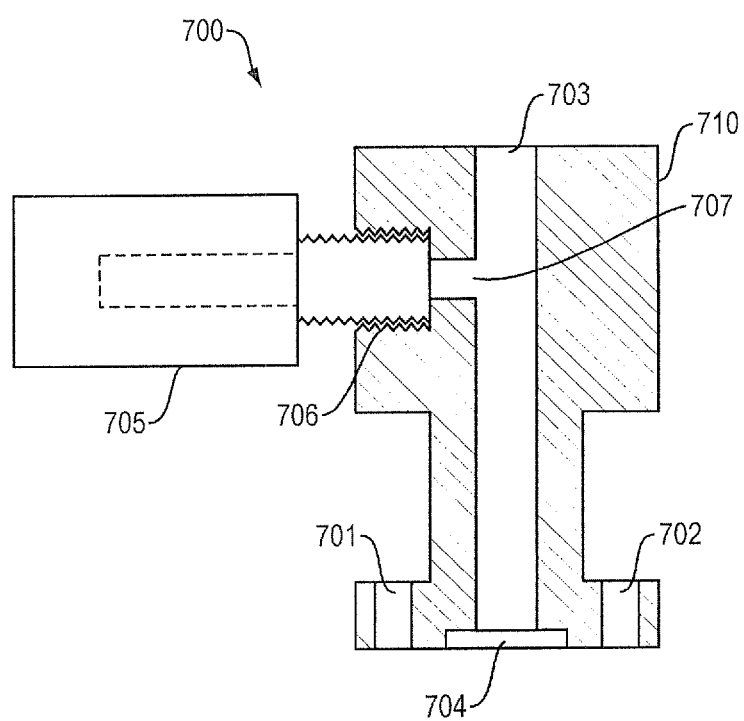
FIG. 7 is a sectional side view of the drill guide and filter assembly.

FIG. 7 is a sectional view of drill guide and filter assembly 700. The drill guide portion 710 may be made of aluminum, brass or steel. It has curved, slotted holes 701, 702 similar to those in the probe base to engage the cap screws in the mounting fitting. A hole 703 through the long axis of the portion 710 will receive the drill bit, while a circular recess 704 in the base will center it on the mounting fitting. The filter portion 705 is a commercially-available compressed-air muffler that is suitable for filtering particles from the air as well as muffling sound. It typically has a ⅛-inch male pipe-thread connection. It screws into a threaded hole 706 in the drill guide portion and connects to the hole 703 at the center of that portion at location 707. The diameter of the portion of hole 703 below location 707 is substantially larger than that of the drill bit, providing free passage of air from the flute of the drill to the muffler and space to collect chips from drilling, while the diameter of the portion of hole 703 above location 707 is essentially equal to the diameter of the drill bit, to inhibit the escape of air and metal chips.

Figure 8:
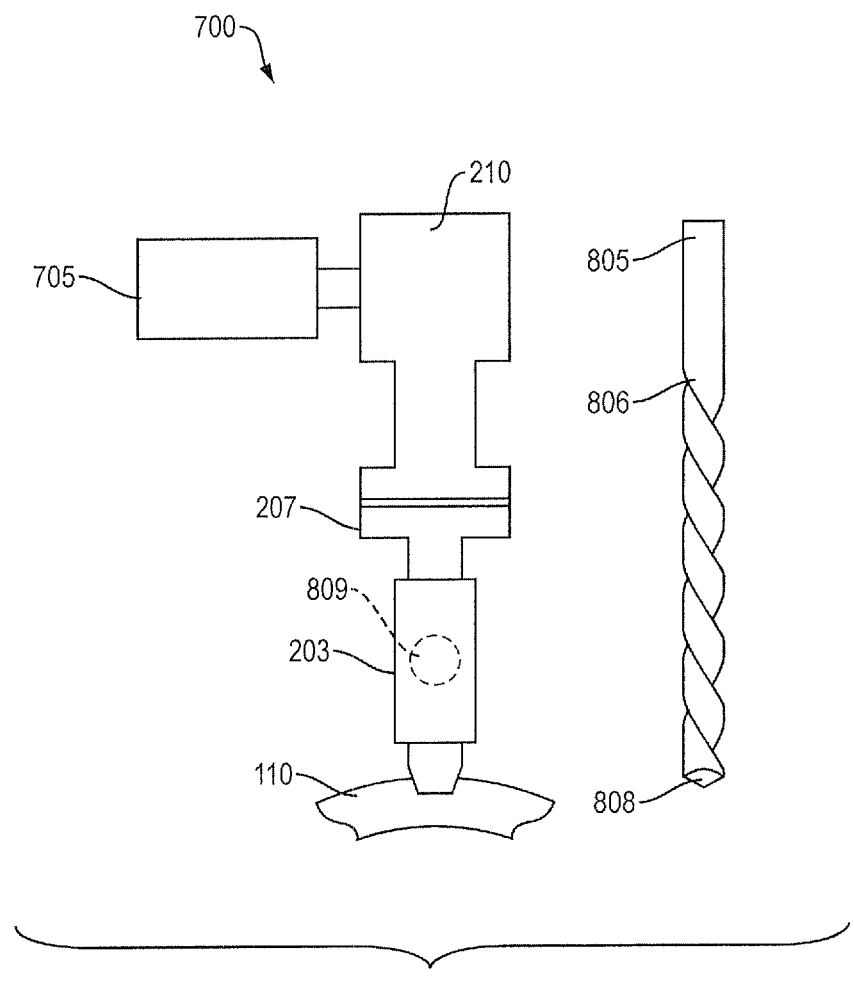
FIG. 8 is an illustration of the relation between the length of the flute of the drill and the dimensions of the other components.

FIG. 8 illustrates the assembly of the parts for drilling and the length of the flute of the drill bit. The drill guide assembly 700 is shown mounted to the mounting fitting 207 which in turn is mounted on the valve 203 and the valve in turn is mounted on the split ring 110. Drill bit 805 is shown next to these assembled parts for clarity. The parts must be dimensioned so that the tip of the drill 808 can be above the top surface of the ball 809 of the valve 203 while the flute 806 is within the drill guide portion 210.

Figure 9:
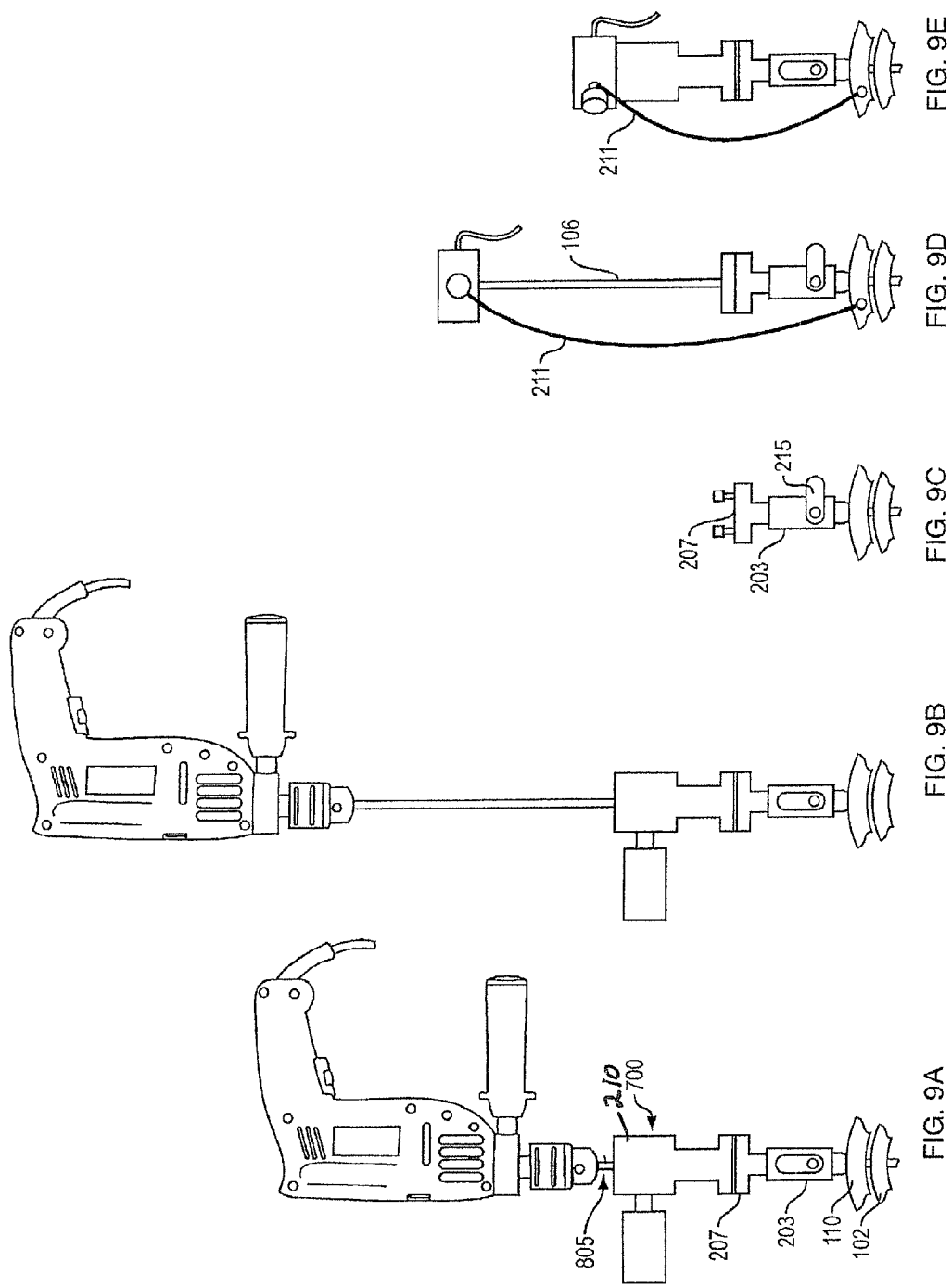
FIGS. 9A-9E show the sequence of steps in the installation of the device of FIG. 1.

FIGS. 9A-9E (representing STEP 1 through STEP 5, respectively) illustrate the process of installing one of the probes in a pipe under pressure. The valve 203 and the mounting fitting 207 are supplied installed in the ring 110, and are held in place together and to the ring with epoxy, so as to control the depth of insertion of the probes into the pipe which is important to the accuracy of the meter. As shown in FIG. 9A, the user first securely clamps the ring 110 to the pipe 102 and affixes the drill guide 210 to the mounting fitting 207 and tightens the screws to secure it in place. Then, using drill guide assembly 700 and a long drill bit with a short flute 805, the user drills the hole in the pipe. (Gloves and full-face protection must be worn during this process.) Once the hole is drilled, air will flow from the inside of the pipe along the drill, through the valve, through the mounting fitting (the hole in which is slightly larger than the drill bit), and through the lower portion of the drill guide (where the hole is substantially larger than the drill bit) and into the filter. This flow of air will reduce the likelihood of chips from the drilling operation entering the pipe.

As shown in FIG. 9B, the user next retracts the drill bit to the point at which the top of the flute of the drill bit is within the drill guide. Air will then rush into the filter, taking most of the chips from the drilling operation with it. As shown in FIG. 9C, the user next withdraws the drill a short additional distance such that the bit is free of the valve, closes the valve via valve handle 215, removes the drill and removes the drill guide and filter assembly.

As shown in FIG. 9D, the user then inserts the probe assembly 106 into the mounting fitting 207. A safety cable 211 is connected from the split ring to the knob at this time to prevent the probe assembly from being pushed out of the hole by air pressure when the valve is opened. Gripping the probe assembly firmly, the operator then opens the valve, presses the probe the rest of the way through the valve and into the pipe, and rotates the probe assembly in order to engage the screws in the probe base. He then tightens the screws. The installed probe is shown as FIG. 9E.

Referring to FIG. 1, the user repeats the process for the second probe assembly 107 and connects power to the device through electrical cable 105. The device will then display flow of compressed air in the pipe.

Figure 10:
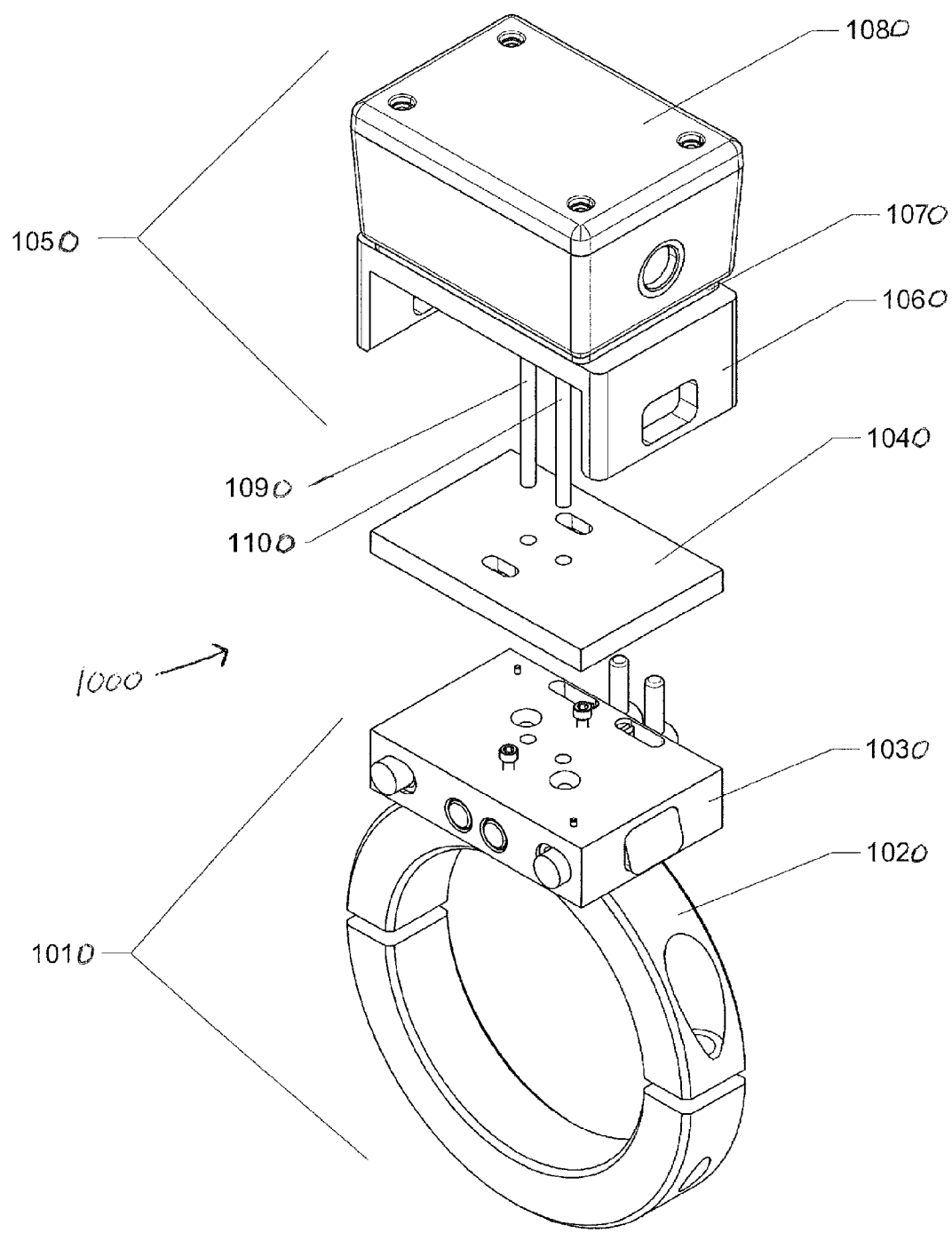
FIG. 10 is an overall view of a second example of the flowmeter.

FIG. 10 is an overall exploded view of a second example of the disclosed flowmeter 1000 showing its key components separated from each other. This example is the currently preferred embodiment. The base assembly 1010, consisting of split ring 1020 and attached base plate 1030 mount on a pipe. The seal plate 1040 is mounted on the base assembly after holes are drilled in the pipe. The top assembly 1050, consisting of top bracket 1060, mounting plate 1070, control enclosure 1080 and two probes 1090 and 1100, is then latched to the base assembly with the probes projecting through drilled holes into the pipe.

Figure 11:
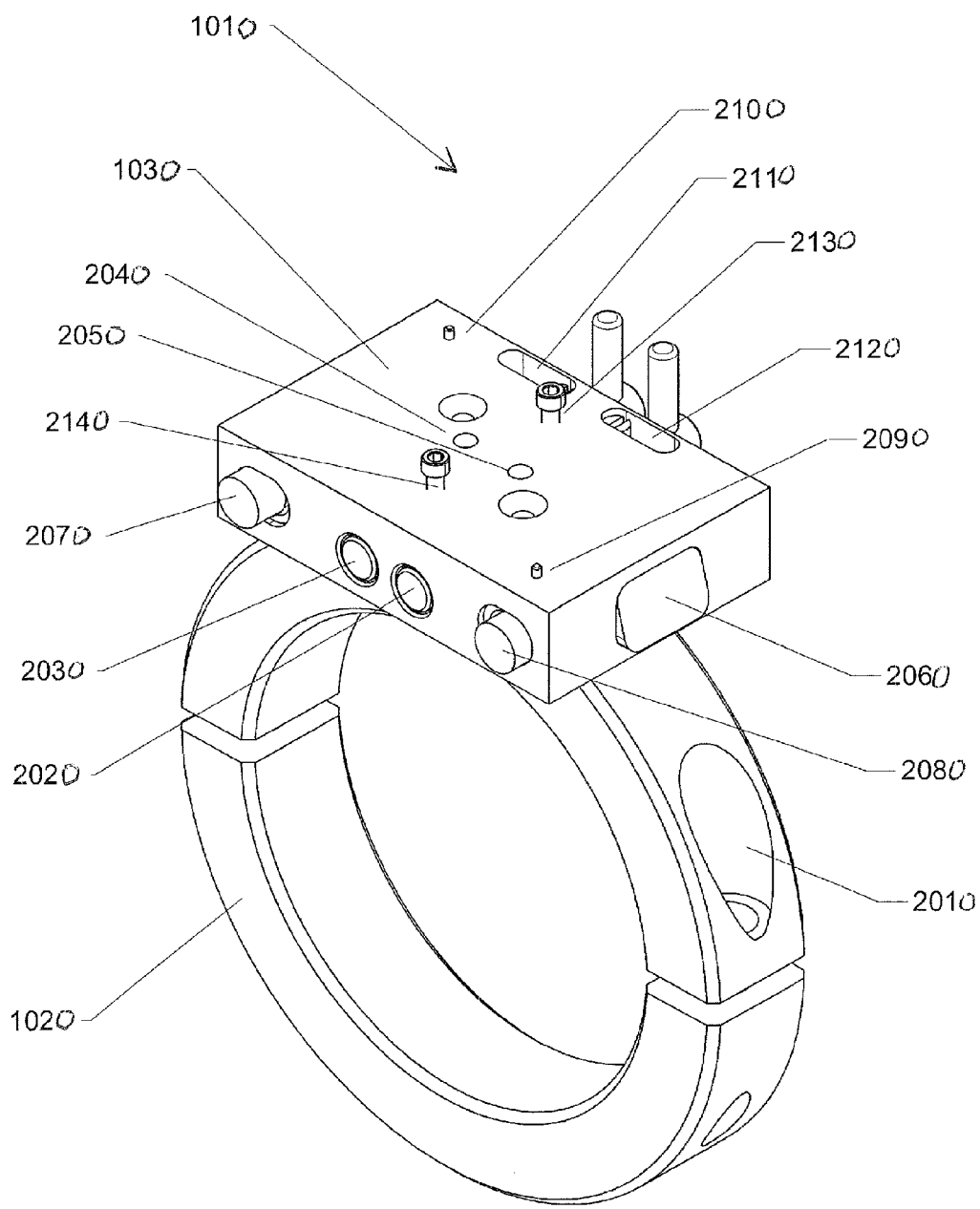
FIG. 11 is an angled view of the base assembly

FIG. 11 is an angled view of base assembly 1010. Split ring 1020 clamps around the pipe using screw holes 2010 and bolts (not shown). A gasket (not shown) seals between the ring and the pipe. Base plate 1030, attached and sealed to split ring 1020, contains quarter-turn valves 2020 and 2030, intersected by through holes 2040 and 2050 which are parallel and extend through base plate 1030 and split ring 1020. Spring-loaded latches 2060 at both ends of the base plate engage top bracket 1060. The movement of the latches is limited by shoulder screws 2070 and 2080. Locating pins 2090 and 2100 engage recesses 6050 and 6060 (FIG. 15B) in seal plate 1040. Slotted holes 2110, 2120 locate pins 4010 in the quarter-turn valves (see FIG. 13). Socket head cap screws 2130 and 2140 (with enlarged heads) are used to secure the drill guide and the seal plate.

Figure 12:
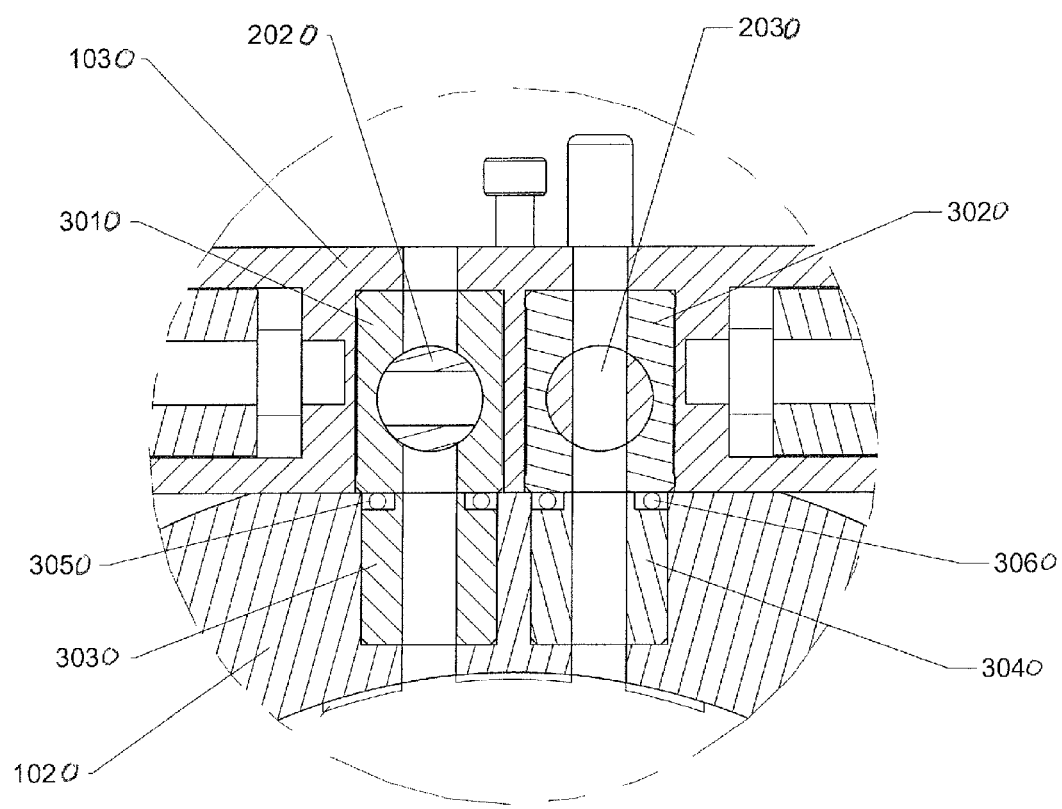
FIG. 12 is partial section view through the base assembly.

FIG. 12 is a section view through split ring 1020, base plate 1030 and valves 2020 and 2030 in closed and open positions, respectively. Seal pieces 3010 and 3020, made of a soft, slippery material such as polytetrafluoroethylene, are pressed into the base plate and form a seal around the valves and against the base plate. Drill bushings 3030 and 3040, typically made of hardened steel and pressed into the split ring with a suitable retaining compound to ensure a seal, guide the drill bit as it enters the pipe. Such guidance is needed because the drill bit enters the wall of the pipe at a slight angle to the perpendicular. O-rings 3050 and 3060 seal between the drill bushings and the seal pieces.

Figure 13:
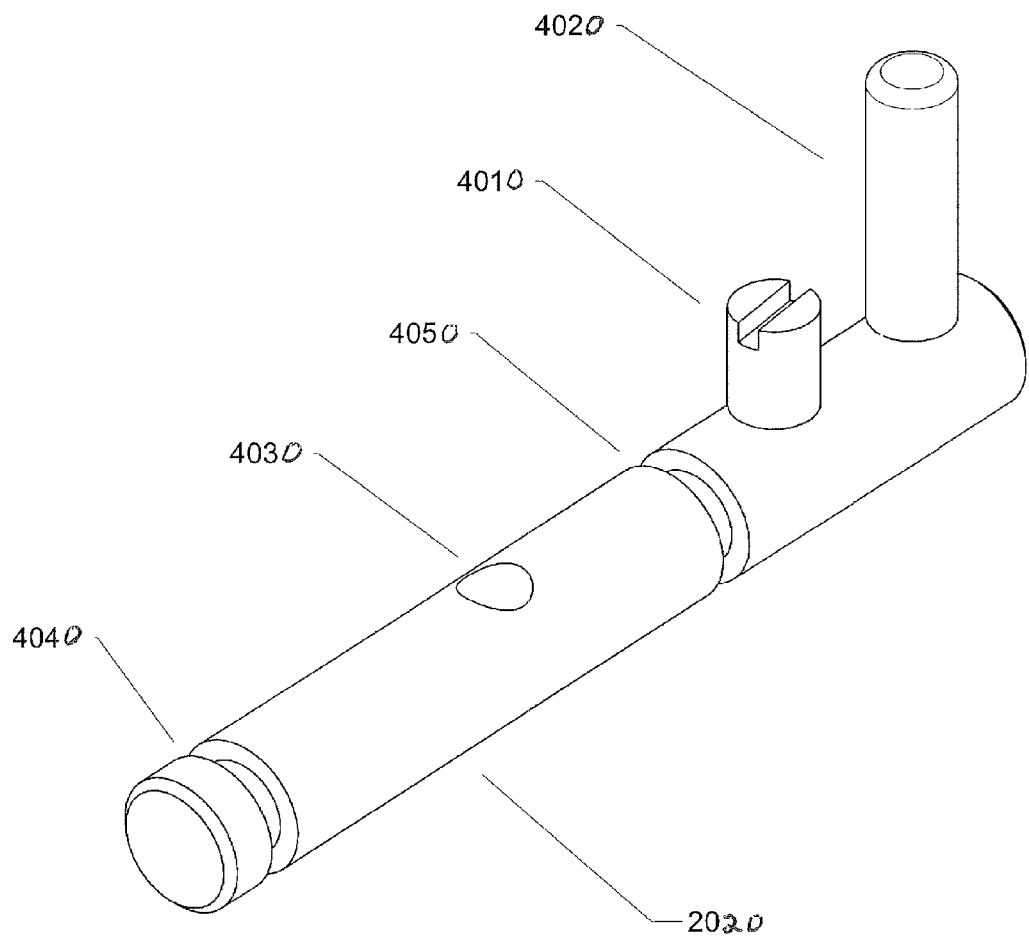
FIG. 13 is an angled view of one of the valves.

FIG. 13 is an angled view of one of the quarter turn valves 2020. Valve 2030 may be identical. The valves may be made of stainless steel. Pin 4010 locates the valve within base plate 1030 and limits its rotary motion. Handle 4020 allows the user to turn the valve and indicates the position of the valve. Hole 4030 is made slightly larger than the drill bit, to avoid interference while minimizing the space in which chips can accumulate. Grooves 4040 and 4050 accommodate O-rings (not shown) to provide a redundant seal against leakage along the valve stem.

Figure 14:
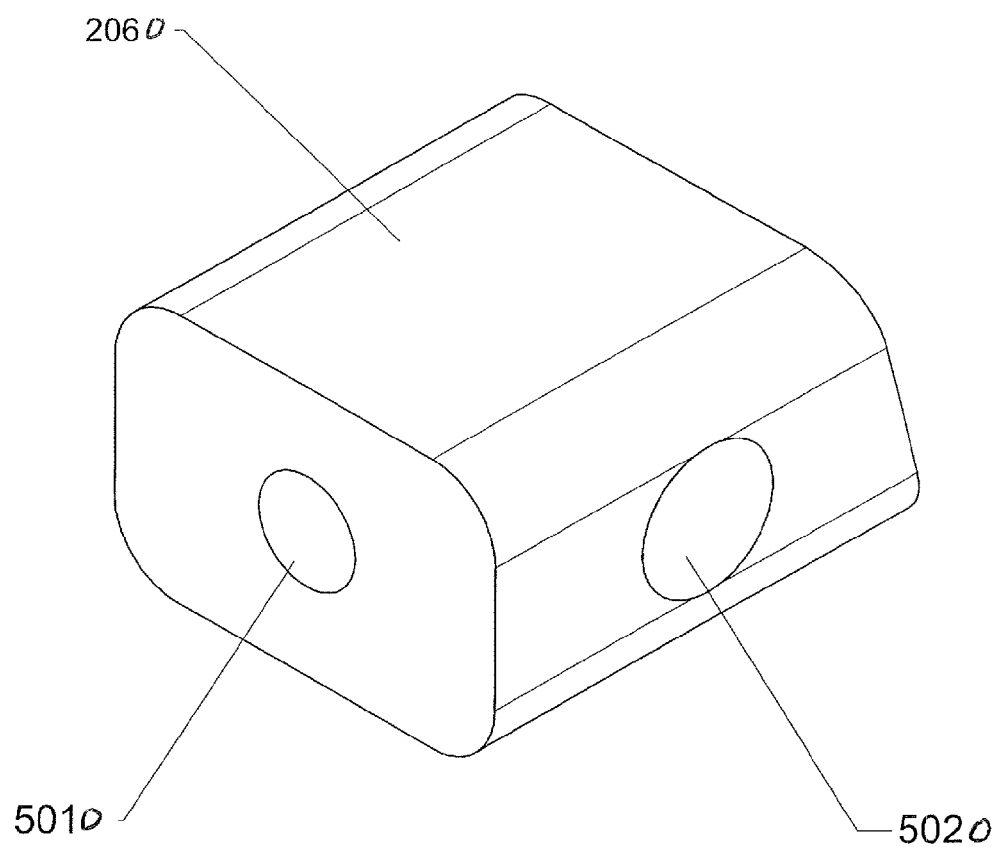
FIG. 14 is an angled view of one of the latches.

FIG. 14 is an angled view of latch 2060. Hole 5010 is made to seat a spring (not shown) which provides movement to the latch. Threaded hole 5020 is used in conjunction with shoulder screw 2080 for limiting the movement of the latch and locking it in place. As shown in FIG. 11, latch 2060 protrudes through opening 7020 in bracket 1060. See FIG. 16.

Figure 15A:
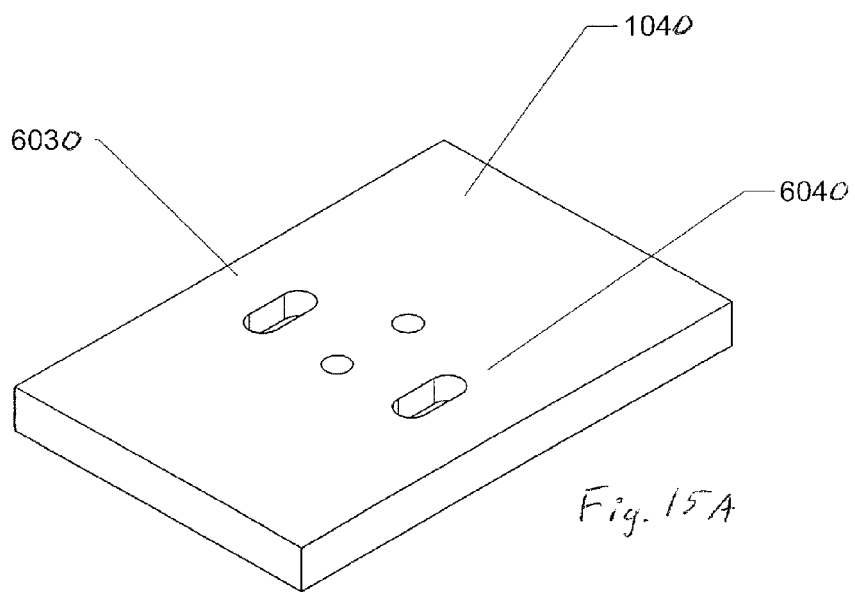
FIGS. 15A and 15B are two angled views of the seal plate, showing the top and bottom surfaces.
Figure 15B:
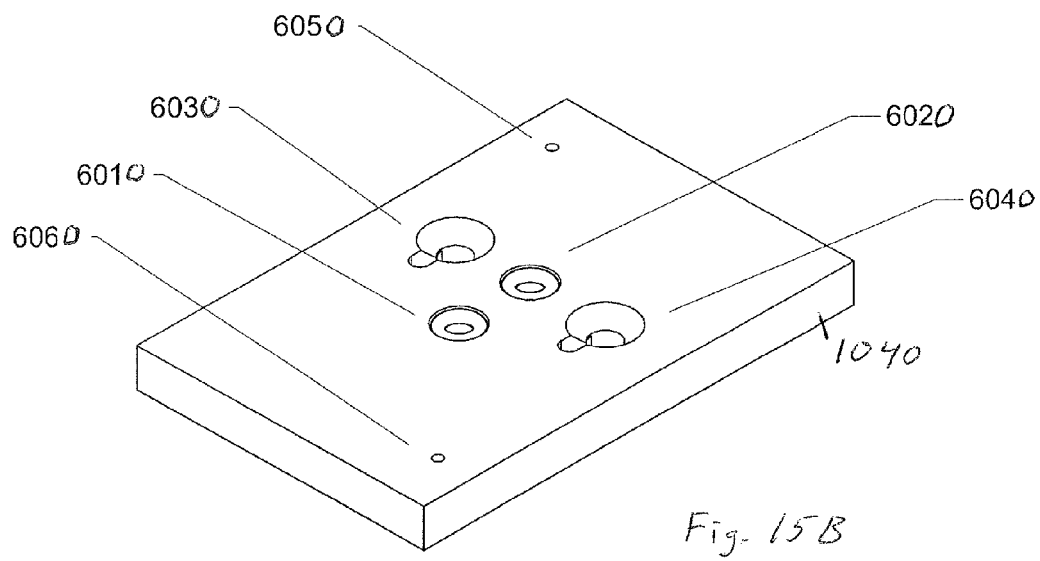

FIGS. 15A and 15B show top and bottom angle views respectively of seal plate 1040. The seal plate provides seals around the probes outside of the valves and it allows these seals to be installed after the holes are drilled in the pipe, so that the seals will not be damaged as the holes are drilled. O-rings 6010 and 6020, on the underside of the seal plate, form the seals around the probes and also seal between the seal plate and the base plate 1030. The seal plate engages cap screws 2130 and 2140 in slotted holes 6030 and 6040. Pins 2090 and 2100 engage recesses 6050 and 6060 in the seal plate in order to locate it accurately in relation to base plate 1030.

Figure 16:
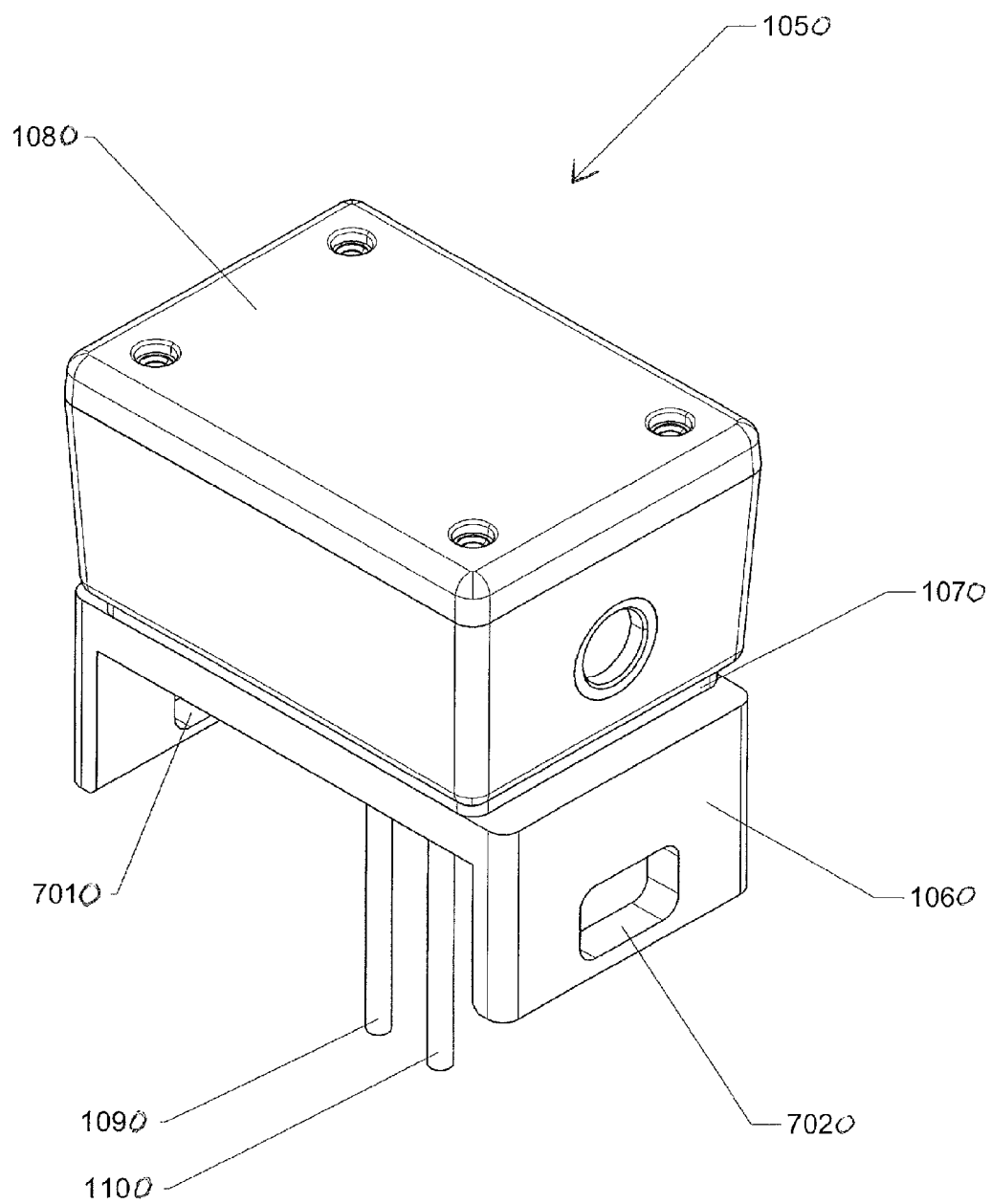
FIG. 16 is an angled view of the top assembly.

FIG. 16 is an angled view of top assembly 1050, including control enclosure 1080, mounting plate 1070, top bracket 1060 and probes 1090 and 1100. The control enclosure is electrically connected to the probes and contains electronic circuitry to sense and display flow. The top bracket includes holes 7010 and 7020 which engage the latches (2060, not shown here). Mounting plate 1070 and top bracket 1060 include provision (not shown, but such as a spring-loaded latch) to permit the control enclosure to be rotated 90 degrees from the position shown to facilitate application to horizontal or vertical pipes. The electronics are typically powered by a wall-plug supply and cable (not shown).

Figure 17:
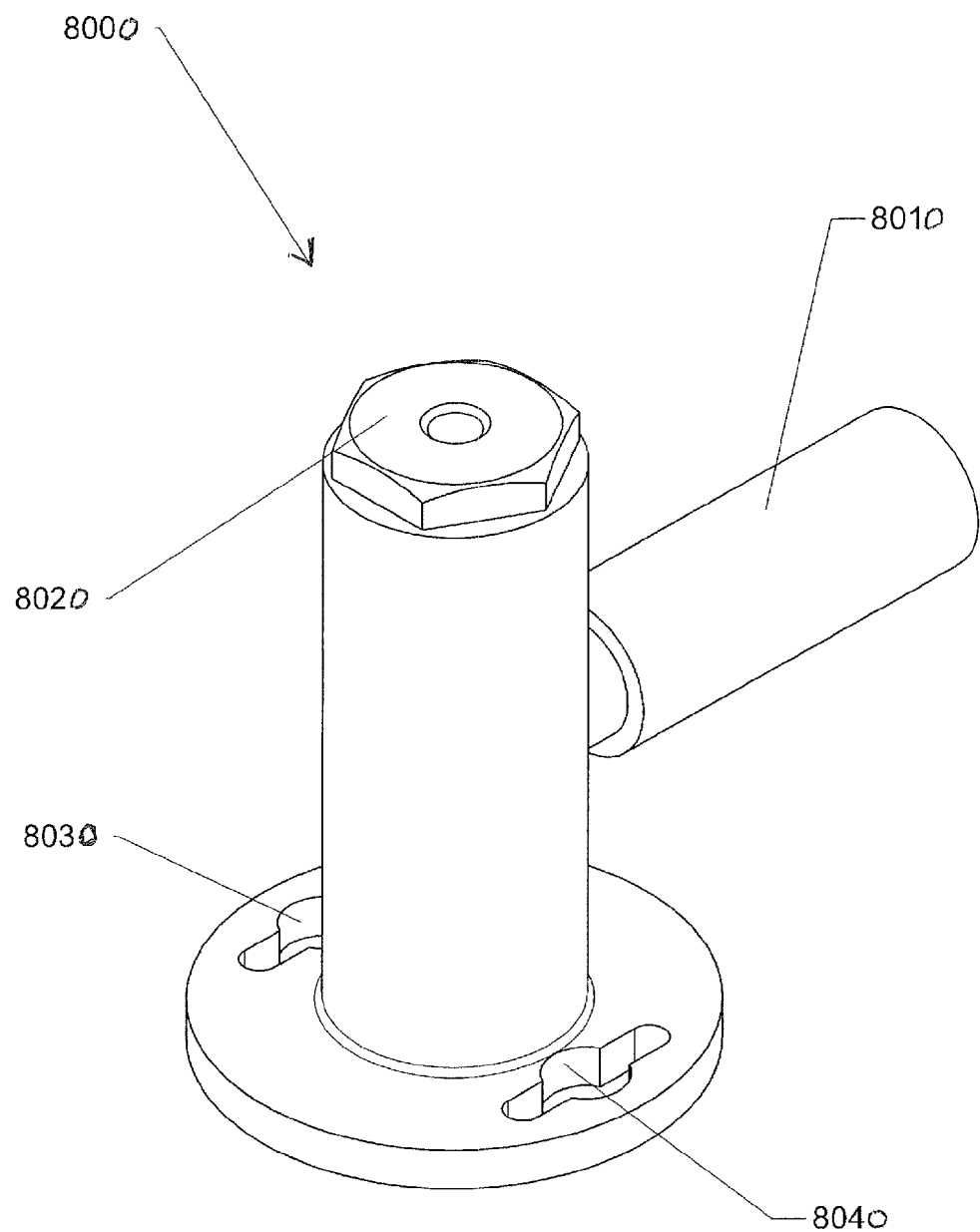
FIG. 17 is an angled view of the drill guide assembly.

FIG. 17 is an angled view of drill guide 8000. The drill guide minimizes noise by directing the escaping fluid through muffler 8010 while simultaneously collecting the chips from the drilling process. Muffler 8010 is a commercially-available muffler of a type used for exhausts from compressed-air tools. It has a threaded connection for mounting. An O-ring seal (not shown) contained by drill-guide screw 8020 prevents leakage out of the drill guide along the shaft of the drill bit. To adapt drill guide 8000 to base plate 1030, slots 8030 and 8040 permit the drill guide to be placed over cap screws 2130 and 2140 and slid to align with one probe hole and then the other.

FIGS. 18A-18E (representing STEP 1 through STEP 5, respectively) show the step-by-step installation process consisting of steps 1-5. FIG. 18A shows drill guide 8000 mounted onto base assembly 1010. Slots allow for sliding for proper alignment with each probe hole. The drill guide is slid to one end of its range of movement and the cap screws are tightened. The drill bit is inserted through the drill guide, past the open slide valve, and up against the application pipe. The user drills through the wall of the pipe. In FIG. 18B, the user extracts the drill bit just beyond the slide valve, then closes the valve and completely removes the drill bit. During the time between the drilling of the hole and the closure of the valve, air flows along the flutes of the drill bit and into the muffler, carrying most or all of the chips from drilling with it. The drill guide seal inhibits or prevents air from escaping along the stem of the drill. The flute of the drill bit should be shorter than the distance between the valve and the drill guide seal, so that the valves can be closed without air and chips escaping along the flute of the drill. The user then closes the valve and then completely removes the drill. FIGS. 18A and 18B are performed for each probe hole. The drill guide is then removed; the cap screws are loosened but remain in place.

In FIG. 18C, the user fits seal plate 1040 over the cap screws, slides it into place with pins 2090 and 2100 engaging recesses 6050 and 6060, and tightens the cap screws.

FIG. 18D prepares for the top assembly to be inserted into the pipe. The user inserts the probes beyond the O-rings on the underside of the seal plate and as far as the closed valves.

In FIG. 18E, the user opens the two valves and presses the top assembly into place, with the probes projecting into the pipe. The two latches engage the cutouts in the upper bracket, holding the top assembly in place. The user then tightens the locking screws to ensure that the latches will not become disengaged. When power is connected to the electronic enclosure, the meter will display flow.

Features of the claimed invention may be shown in some drawings and not others, and may not all be shown in the same drawing. The examples above support but do not limit the claims.

What is claimed is:

1. A flowmeter of the thermal type, having a heated flow-sensing element and a temperature-sensing reference element, the elements constructed and arranged to be installed in a pressurized pipe, comprising:
    one probe with the heated element;
    a separate second probe with the reference element;
    wherein the probes are constructed and arranged to pass through the pipe wall in separate through-holes;
    a mechanical mounting structure that is adapted to be mounted to the pipe;
    a base plate mounted on the mounting structure; and
    two valves operatively coupled to separate locations of the mounting structure, where one probe passes through each valve and into the pipe;
    wherein the base plate has two spaced probe-receiving holes passing therethrough from top to bottom, where the valves each comprise a hole that can be selectively aligned and misaligned with a probe-receiving hole in the base plate, and wherein the mechanical mounting structure has two spaced probe-receiving holes passing therethrough from top to bottom and that are aligned with the probe-receiving holes in the base plate.

2. The flowmeter of claim 1 further comprising a control enclosure that is adapted to be coupled to the mounting structure, and wherein the probes are fixed to and project from the control enclosure.

3. The flowmeter of claim 2 wherein the valves each comprise an opening to receive a probe therethrough.

4. The flowmeter of claim 3 further comprising a bracket coupled to the control enclosure and adapted to be engaged with the mechanical mounting structure.

5. The flowmeter of claim 1 wherein the mechanical mounting structure further comprises a split ring, where the base plate is mounted on the split ring.

6. The flowmeter of claim 5 wherein the base plate comprises spring-loaded latches.

7. The flowmeter of claim 6 further comprising two enlarged head structures projecting from a top surface of the base plate.

8. The flowmeter of claim 7 further comprising a seal plate that lies on top of the base plate, where the seal plate has slots that engage with the enlarged head structures, and where the seal plate further comprises two spaced probe-receiving holes passing therethrough from top to bottom.

9. The flowmeter of claim 8 wherein the seal plate further comprises O-rings on the bottom of the seal plate and surrounding the probe-receiving holes, to form seals around the probes and also seal between the seal plate and the base plate.

10. The flowmeter of claim 1 further comprising seal pieces in the probe-receiving holes in the base plate, where the seal pieces are soft so as to form a seal around the valves and against the base plate.

11. The flowmeter of claim 10 further comprising hardened drill bushings in the probe-receiving holes in the mechanical mounting structure to help guide a drill bit as it enters the pipe.

12. The flowmeter of claim 11 further comprising O-rings that seal between the drill bushings and the seal pieces.

13. The flowmeter of claim 1, wherein the valves are located in the base plate.

14. A flowmeter of the thermal type, having a heated flow-sensing element and a temperature-sensing reference element, the elements constructed and arranged to be installed in a pressurized pipe, comprising:
    one probe with the heated element and a separate second probe with the reference element, wherein the probes are constructed and arranged to pass through the pipe wall in separate through-holes;
    a mechanical mounting structure that is adapted to be mounted to the pipe, wherein the mechanical mounting structure comprises a split ring and a base plate mounted on the split ring, wherein the base plate comprises spring-loaded latches and two enlarged head structures projecting from a top surface of the base plate, and wherein the base plate has two spaced probe-receiving holes passing therethrough from top to bottom;
    two valves operatively coupled to separate locations of the mounting structure, wherein the valves each comprise an opening to receive a probe therethrough such that one probe passes through each valve and into the pipe, where the valves each comprise a hole that can be selectively aligned and misaligned with a probe-receiving hole in the base plate, and wherein the split ring has two spaced probe-receiving holes passing therethrough from top to bottom and that are aligned with the holes in the base plate;
    a control enclosure that is adapted to be coupled to the mounting structure, and wherein the probes are fixed to and project from the control enclosure;
    a bracket coupled to the control enclosure and adapted to be engaged with the mechanical mounting structure;
    seal pieces in the probe-receiving holes in the base plate, where the seal pieces are soft so as to form a seal around the valves and against the base plate;
    hardened drill bushings in the probe-receiving holes in the split ring to help guide a drill bit as it enters the pipe;
    O-rings that seal between the drill bushings and the seal pieces;
    a seal plate that lies on top of the base plate, where the seal plate has slots that engage with the enlarged head structures, and where the seal plate further comprises two spaced probe-receiving holes passing therethrough from top to bottom, wherein the seal plate further comprises O-rings on the bottom of the seal plate and surrounding the probe-receiving holes, to form seals around the probes and also seal between the seal plate and the base plate.

15. The flowmeter of claim 14 further comprising a drill guide and filter assembly adapted to be releasably coupled to the base plate via the enlarged head structures, wherein the drill guide and filter assembly comprises a drill guide assembly with a longitudinal opening that is adapted to receive a drill bit, and wherein the drill guide and filter assembly further comprises a muffler that is fluidly coupled to the opening at a coupling location.

* * * * *